United States Patent
Buchmann et al.

(10) Patent No.: US 8,099,431 B2
(45) Date of Patent: Jan. 17, 2012

(54) SERVICES FOR DATA ACCESS BASED ON A DATA OWNERSHIP DIRECTORY IN DISTRIBUTED SYSTEM LANDSCAPES

(75) Inventors: Daniel Buchmann, Pfinztal (DE); Uwe E. Fischer, Karlsruhe (DE); Jochen Hoenig, Oehringen (DE); Oliver Scheerer, Nussloch (DE); Bernhard P. Waldscheck, Karlsruhe (DE)

(73) Assignee: SAP AG, Walldorf (DE)

( * ) Notice: Subject to any disclaimer, the term of this patent is extended or adjusted under 35 U.S.C. 154(b) by 1346 days.

(21) Appl. No.: 11/433,151

(22) Filed: May 12, 2006

(65) Prior Publication Data

US 2007/0276919 A1    Nov. 29, 2007

(51) Int. Cl.
*G06F 17/30* (2006.01)
(52) U.S. Cl. ......... 707/781; 707/622; 707/705; 709/217
(58) Field of Classification Search .................. 707/622, 707/705, 781; 709/204, 217
See application file for complete search history.

(56) References Cited

U.S. PATENT DOCUMENTS

| | | | |
|---|---|---|---|
| 2004/0133640 A1* | 7/2004 | Yeager et al. | 709/204 |
| 2005/0144186 A1* | 6/2005 | Hesselink et al. | 707/101 |
| 2006/0168225 A1* | 7/2006 | Gunning et al. | 709/226 |

* cited by examiner

*Primary Examiner* — Belix M Ortiz
(74) *Attorney, Agent, or Firm* — Mintz, Levin, Cohn, Ferris, Glovsky and Popeo, P.C.

(57) ABSTRACT

A directory includes information about various systems (e.g., applications, processes, tasks, objects, services) and data, and may include data ownership information. The directory may define existing systems, corresponding locations by address, and corresponding semantic names. The directory may also specify the role of each system, e.g., a consumer or provider role. The directory may also define a scope of data a provider system can provide. As such, the directory may also include information about whether and how such data is being replicated. When a user requests data, a service may, based on the directory, determine and select an appropriate provider system for the data. The service may further create a subscription process to provide the user a local cache of the requested data. With such directory information, a service can provide data access services that integrate subscription processes.

15 Claims, 4 Drawing Sheets

SERVICES FOR DATA ACCESS BASED ON A DATA OWNERSHIP DIRECTORY IN DISTRIBUTED SYSTEM LANDSCAPES

TECHNICAL FIELD

The subject matter described herein relates to accessing data, including objects, via a data access or information service that can access data either locally or remotely.

BACKGROUND

Companies are increasingly adopting multiple applications which run across multiple networks, and which may store data, including data objects, in various places across the multiple networks. With conventional systems, the multiple applications must know where relevant data is located. For example, an application typically knows if it can access relevant data locally in the system or if the application must access the data from across a network, in which case it generally knows where to find that data. Alternatively, the application could include the functionality to figure out where such data is located.

Further, some applications that require frequent access to particular data sometimes have a local copy of that data available for quick access, while the master data or the "single source of truth" for that data is located remotely, but updated periodically in some manner (generally referred to as replication). In such a case, if the application accesses the local copy of the data, it may or may not be the most recent version of that data. That is, the master data may have been changed, but the local copy of that master data may not yet be updated to reflect that change. As such, applications typically must know some lower-level information (e.g., node address) about the data they use and may also have to deal with the fact that data may or may not be completely up to date.

Not only do applications typically have to know where their relevant data is located, but applications generally need some mechanism for handling read/write access and maintaining consistency among data that has been replicated across a network.

SUMMARY

In one aspect, a directory (which may be a central directory) may include information about various systems (e.g., applications, processes, tasks, objects, services) and data, and may further include data ownership information for the various systems and data. The directory may define existing systems, corresponding locations by address, and corresponding semantic names. The directory may also specify the role of each existing system, e.g., a consumer role or a provider role. The directory may also define a complete set or scope of data that the system uses to perform its function. Also, the directory may include information defining the scope of data that it can provide to other systems. The directory and may also specify an access type for each data, e.g., read-only or read-write access, and may specify a level of data quality.

With such information, an information service may provide appropriate data to requesting systems. The data may be located locally, remotely, cached locally, cached remotely, or any combination thereof. Further, a system can access data via a semantic level, rather than an addressing level.

An information service may receive a request for data from a system; determine, from a directory, a provider system that can provide the requested data; determine, from the directory, whether there is a subscription process caching data that includes the requested data; get the requested data from at least one of the provider system and the cached data; and provide the requested data to the system.

The information service may also determine whether the request for the data is a read-only access request or a read-write access request. The information service may further determine that the request for the data is a read-write access request; determine, from the directory, a provider system that can provide read-write access to the data; get the requested data from the provider system that can provide read-write access to the data; and provide the data to the system.

The information service may also determine whether the request for the data is a request for master data of the requested data. The information service may further determine, from the directory, a provider system that can provide master data of the requested data; get the data from the provider system that can provide master data of the requested data; and provide the data to the system.

The information service may determine, from the directory, a first provider system that can provide a first portion of the requested data; and determine, from the directory, a second provider system that can provide a second portion of the requested data, the first portion of requested data and the second portion of requested data, in combination, forming at least the requested data. The information service may further request the first portion of data from the first provider system; request the second portion of data from the second provider system; receive the first portion of data from the first provider system; receive the second portion of data from the second provider system; assemble the received first portion of data and the received second portion of data; and provide the assembled data to the system.

The information service may determine that a subscription process has been initiated and is caching data to a first data processing apparatus; determine, from a directory, a system executing on the first data processing apparatus using the data being cached; and update the directory to include the system executing on the first data processing apparatus as a potential provider system for the data being cached. The information service may update the directory to include an indication that the cached data includes read-only data, update the directory to include an indication that the cached data does not include master data, and update the directory to include a semantic representation of the cached data and a corresponding address of the cached data.

The information service may receive a request for data from a system; determine, from a directory, at least one provider for the data; determine, from the directory, a specified level of quality for the data; select a provider that meets the specified level of quality for the data; request the data from the selected provider; and receive the data from the selected provider; and provide the data to the system.

Computer program products, tangibly embodied in information carriers are also described. Such computer program products may cause a data processing apparatus to conduct one or more operations described herein.

Similarly, systems are also described that may include a processor and a memory coupled to the processor. The memory may encode one or more programs that cause the processor to perform one or more of the operations described herein.

The details of one or more variations of the subject matter described herein are set forth in the accompanying drawings and the description below. Other features of the subject matter

DESCRIPTION OF DRAWINGS

Like reference symbols in the various drawings indicate like elements.

DETAILED DESCRIPTION

Figure 1:
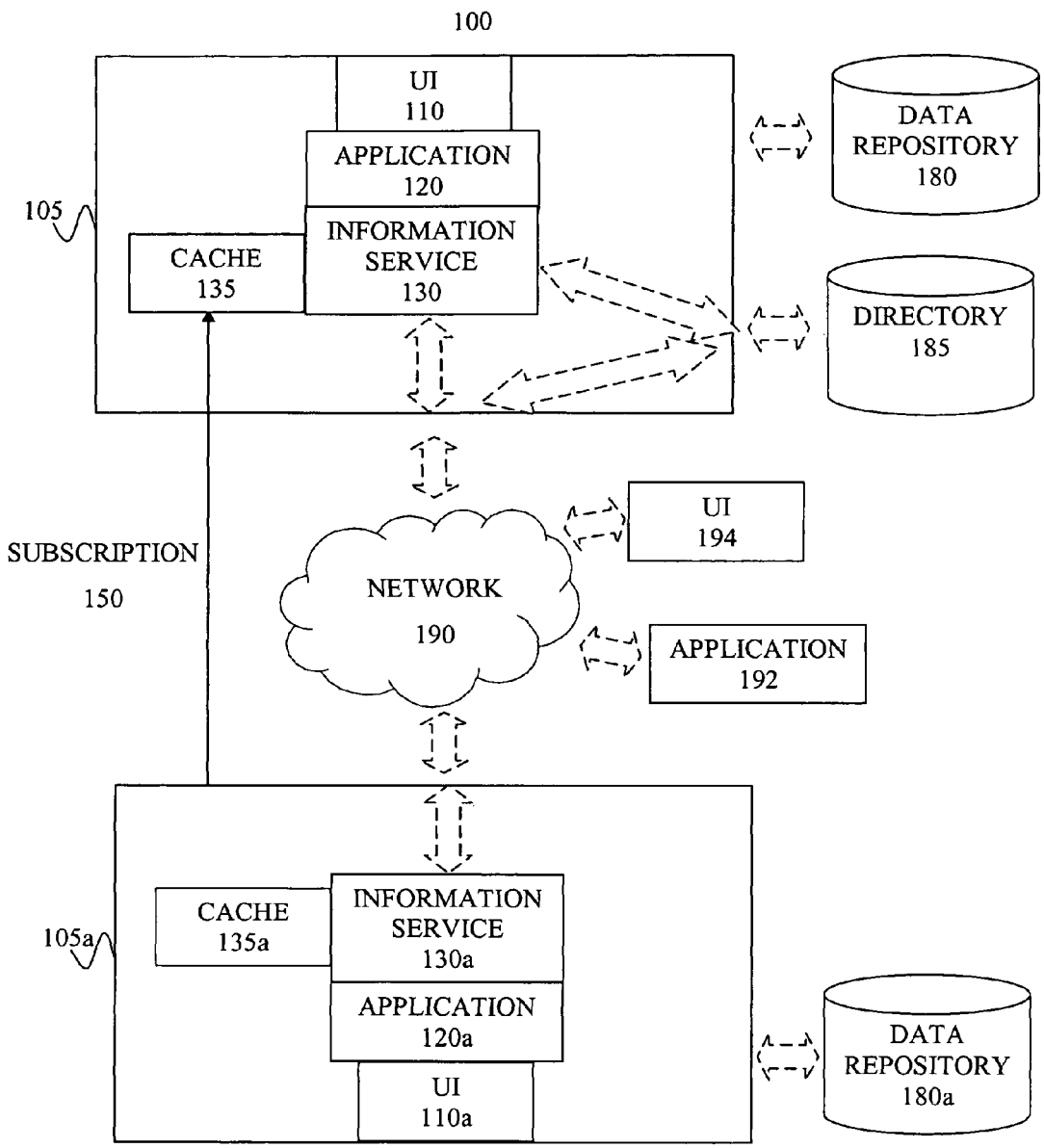
FIG. 1 is a schematic diagram illustrating a networked system and an apparatus for accessing data.

FIG. 1 shows an illustrative networked system 100. As shown, networked system 100 may include a first computing apparatus 105 and a second computing apparatus 105a in communication via network 190. First computing apparatus 105 and second computing apparatus 105a may each be a personal computer, laptop computer, handheld computer, handheld communication device, wireless phone, and the like. Network 190 may be the Internet, a wide area network, a local area network, an Ethernet network, a token-ring network, a wireless network, a wire line network, and the like. Other apparatus may also communicate with first computing apparatus 105 and second computing apparatus 105a, such as, for example, user interface 194 and application 192 executing on another computing apparatus. Moreover, multiple computing apparatus 105 may communicate via network 190.

First computing apparatus 105 may include a user interface 110, which in turn may include a display screen, a keyboard, a mouse, and the like for receiving user input and outputting information to a user. First computing apparatus 105 may also include, or execute, an application 120 in communication with user interface 110. Application 120 may be any application, such as, for example, an enterprise resource planning application, a supply chain management program, an asset management application, a mobile business application, an accounting application, a spreadsheet application, a word processing application, and the like. Second computing apparatus 105a may include a similar user interface 110a and may also include, or execute, a similar application 120a.

First computing apparatus 105 may also include a data repository 180 containing data, including objects, relevant to application 120 and/or to application 120a. Similarly, second computing apparatus 105a may also include a data repository 180a containing data relevant to application 120 and/or to application 120a. As such, with a conventional system, applications 120 and 120a would know or would be able to figure out where data is located (e.g., for application 120, whether the relevant data is stored locally in data repository 180 or remotely in data repository 180a).

Data repository 180 may contain data relevant to application 120 executing on first computing apparatus 105 and/or to application 120a executing on second computing apparatus 105a. Likewise, data repository 180a may contain data relevant to application 120 executing on first computing apparatus 105 and/or to application 120a executing on second computing apparatus 105a. Data repository 180 may be integral to first computing apparatus 105, may be directly connected to first computing apparatus 105, e.g., via a USB port and the like, and may also be remotely connected to first computing apparatus 105, e.g., via a network connection and the like (and similarly for data repository 180a with respect to second computing apparatus 105a).

Information service 130 provides an interface between application 120 and the data used by application 120, whether that data resides locally at first computing apparatus 105 or whether that data resides remotely, e.g., at second computing apparatus 105a or the like. In this manner, application 120 may request data via interaction with information service 130 without having to know exactly where the data is located. Information service 130 retrieves or manages the data retrieval of the relevant data for application 120 (and similarly, information service 130a retrieves or manages the data retrieval of the relevant data for application 120a). Thus, information service 130 can manage the retrieval of data locally from data repository 180 or remotely from data repository 180a via network 190. In this manner, application 120 is not burdened with knowing the particular communication protocols required for communication over network 190 (or even with knowing whether or not the requested data is located locally or remotely over network 190).

To facilitate such retrieval of data, information service 130 is in communication with directory 185, described in more detail below. Directory 185 is typically a central directory that contains directory information about data. Directory 185, however, for performance reasons or otherwise, may be replicated across the network 190. While directory 185 is shown as a physically separate data store, directory 185 and data repository 180 may be housed in a single data store or may be distributed among various data stores. Further, a single central information service 130 may be implemented, or multiple distributed information services 130 (e.g., 130, 130a, etc.) may be implemented across networked system 100.

Data from data repository 180 may be replicated to second computing apparatus 105a. That is, if application 120a regularly accesses a particular data from data repository 180, it may make sense, for performance reasons, to replicate that data to a cache 135a in second computing apparatus 105a. Similarly, as shown, it may make sense to replicate data from data repository 180a to a cache 135 in first computing apparatus 105.

Such replication may be implemented via a subscription process 150 that replicates some data, at periodic intervals or otherwise, from one computing apparatus to another. Again, with such replication, the issue arises as whether the replicated data truly represents the current master data or "single source of truth."

To assist information service 130, directory 185 may include specific information regarding the data available to the applications 120 in the networked system 100. For example, a first dimension of the directory 185 may define the scope of the data relevant for a particular system (e.g., application, process, task, object, service, and the like). The scope of data may, for example, be a particular object, which may be based on an object type of "Product" of "Business Partner," for example. The scope of data may also be a portion of an object, for example, address data, or just a single attribute of an object, for example, a zip code. If an object contains sub-instances, the scope of data must be a single sub-instance, multiple sub-instances, or all sub-instances. The scope of data may be defined using negatives, such as "Employee data except for salaries."

A second dimension of the directory 185 may specify the role of a particular system. The role may be a consumer role or a provider role, for example. A consumer role, for example, may represent that the system is a consumer of data or services. In this case, the directory 185 may also include information that defines the complete set or scope of data that the system uses to perform its function.

On the other hand, a provider role may represent, for example, that the system provides data or services to other systems. In this case, the directory 185 may also include information defining the scope of data that it may provide to other systems. The definition may be, for example, a definition that the system will provide data to any other system, that it will provide data to only pre-defined or otherwise enumerated, defined, or determined systems.

A third dimension of the directory 185 may identify an access type. For example, the directory may identify that a particular provider system may supply read-only access, read-write access, etc.

A fourth dimension of the directory 185 may identify a level of data quality. Thus, the directory may identify, for example, that a particular provider system can provide master data (or the "single source of truth") or that a particular provider system can only provide replicated data (which may or may not up-to-date with the master data).

With such a directory 185, each system may have defined its relevant data, a set of data it uses to complete its task or function or a set of data it can provide, a definition of the type of access it requests or provides, and a definition of the data quality it desires or provides. Directory 185 may further include information about the location of various data and services and information about whether and how such data is being replicated to other locations.

With such information available to information service 130, application 120 may request data or services from information service 130 without specifying the location of the data. Information service 130 may provide the service of retrieving or supplying the requested data or services to application 120, whether the data or service is located locally, remotely, cached locally, cached remotely, or any combination thereof. Application 120 may then access data via a higher level, for example, a business application level, rather than accessing data via the lower level of specifying the data's location. Further, application 120 may do so without concern for protocols, messaging faults, and the like. Information service 130 may be implemented centrally on a single computing apparatus or on multiple computing apparatuses, as shown.

Figure 2:
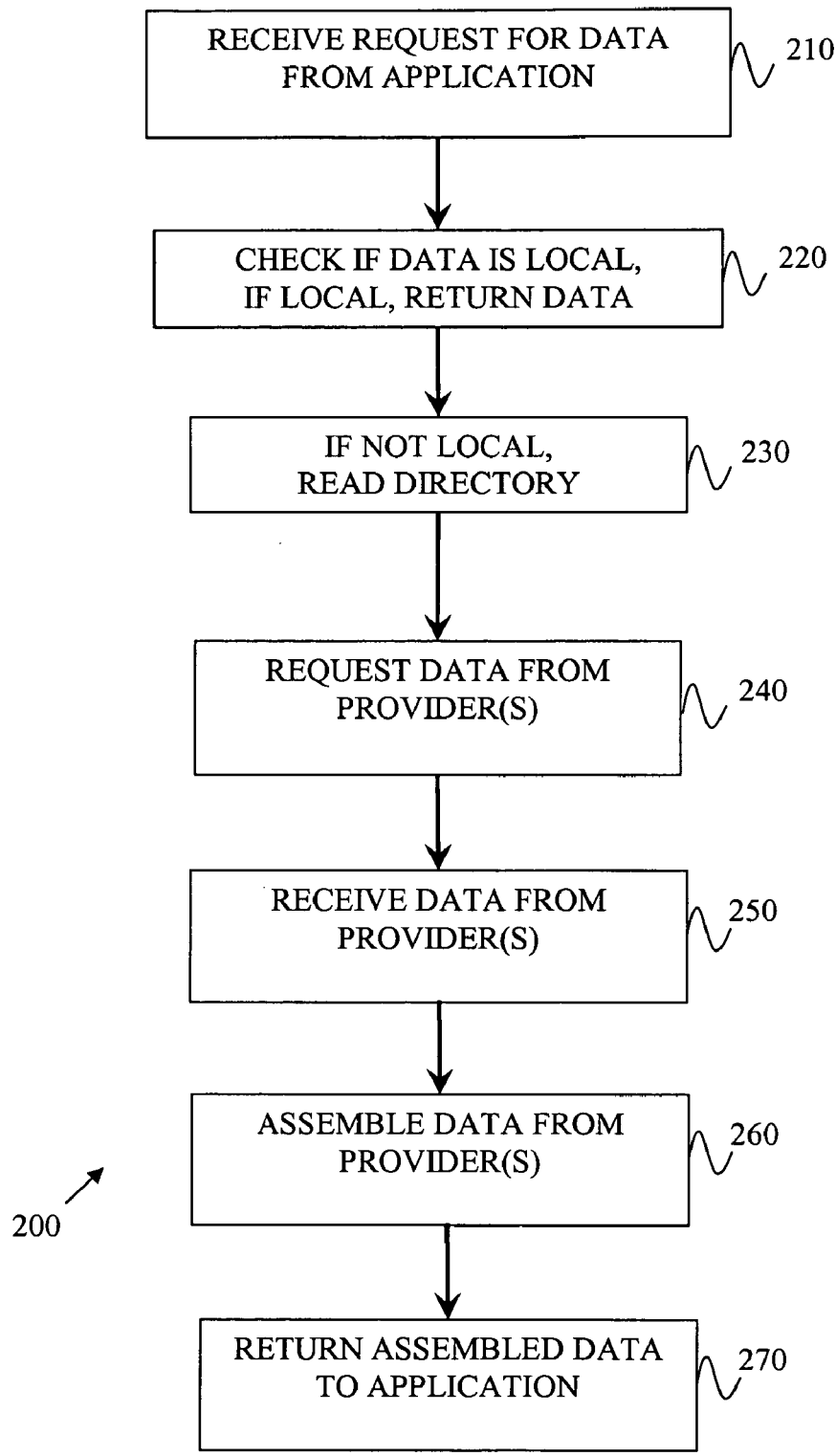
FIG. 2 is a process flow diagram illustrating a method for accessing data.

FIG. 2 shows an illustrative method 200 for data access. As shown at 210, information service 130 may receive a request from application 120 for data, which may include a request for a plurality of data, thereby defining a scope of data requested. While the description of method 200 below describes application 120 as requesting data, the data request could come from any system, task, and the like that utilizes data. Application 120 may refer to the data without specifying the location of the data (e.g., application 120 may refer to the data at a business object level rather than at an address level). Information service 130 may launch agents to process individual or multiple portions of method 200. For example, information service 130 may launch one agent to get data on behalf of the application and a second agent to assemble/format and send data to application 120. Further, the data retrieved by information service 130 may be stored in a stack (or elsewhere) until ready to be sent to application 120.

At 220, information service 130 may determine if all of the requested data is stored locally. If all of the requested data is stored locally, then information service 130 may retrieve the requested local data, assemble the data, and return the data to application 120. Locally stored data may include local provider systems having data stored local to application 120 or remote provider systems having data cached (via a subscription process) local to application 120.

If, however, not all of the requested data (meeting the specified criteria) is stored (or cached) locally, at 230, information service 130 may read from directory 185 to determine the appropriate provider of the requested data. Information service 130 may determine, from directory 185, which provider system(s) are best fit provide the data, given the scope of data requested. Because application 120 may have requested multiple pieces or sets of data, information service 130 may determine that there are multiple providers of the requested data. That is, the same piece or set of data may reside at multiple locations (e.g., because of replication via subscription processes). Also, different pieces of data, both requested by application 120, may be located at different locations in system 100.

At 240, information service 130 requests data from the providers determined at 230 based on the information read from the directory 180. If there are multiple providers determined at 230, information service 130 selects the best set of providers from which to request the data. Information service 130 may select that set of providers that minimizes the number of providers, may select the set of providers that has fastest response times, that balances network load, combinations thereof, and the like. If there are multiple providers determined at 230, information service 130 formats multiple requests to multiple providers which were selected to provide the requested data.

Also, at 240, if application 120 has specified read or write access in the directory 185, information service 130 may format requests to providers in accordance with that specification. Further, if application 120 has specified a particular level of quality, information service 130 may format requests to particular providers that can provide that specified level of quality.

As an alternative to requesting data from multiple data providers, at 240, information service 130 may rely on a cascading request that cascades through various providers, each of which append their relevant data and then forward the appended-to request along to the next data provider, until all data providers have appended their requested data. The final provider (i.e., no remaining request) sends the complete response to the original consumer. Further, a provider system may route the part of the request that provider system is not able to satisfy along to another provider system that can satisfy that portion of the request. Then, cascading may be done backwards. That is, each provider system returns its response to the provider system that called it.

At 250, information service 130 receives data from a provider or providers in response to the request or requests made at 240. Information service 130 may also perform messaging checks to confirm that it has received all the appropriate responses to the requests at 240, sending a subsequent request to a provider if appropriate.

At 260, information service 130 assembles the data received at 250 into an appropriate form for application 120. At 270, information service 130 returns the assembled data to application 120. As can be appreciated, information service 130 can provide application 120 not only with remote and "local" data but also with locally cached data (e.g., data cached via a subscription process). Such subscription processes may be setup in a variety of ways, such as described in connection with FIGS. 3 and 4.

Figure 3:
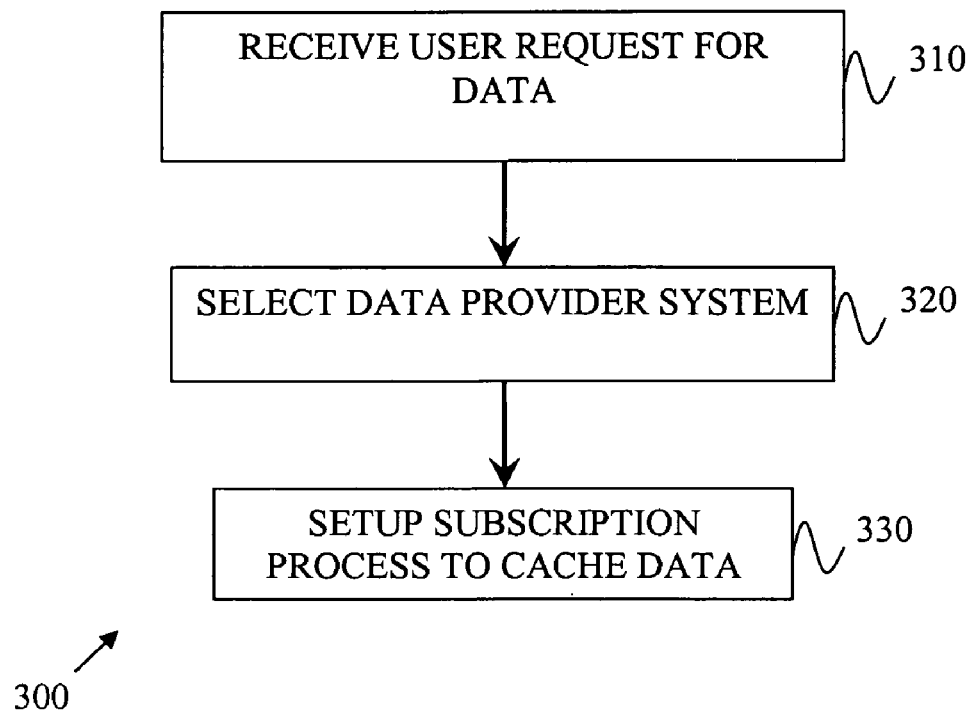
FIG. 3 is a process flow diagram illustrating another method for accessing data.

FIG. 3 shows another illustrative method 300 for data access. As shown at 310, information service 130 receives a user request for data. The user request may be received, for example, via application 120 or other applications. The user does not have to specify a provider system, but can simply request particular data.

At 320, information service 130 selects, based on directory 185, provider system(s) that can provide the requested data.

Then at 330, information service 130 causes a subscription process to be created that provides the requested data from the selected provider(s) to cache the requested data locally, e.g., locally to application 120 in first computing apparatus 105. The created subscription process may cache data from a single provider to a single system or from multiple providers to a single system, (or from multiple providers to multiple systems, etc.). While a user may request the creation of a subscription process, such subscription processes may be created based on other factors. For example, as shown in FIG. 4, information service 130 may select which data is to be cached via a subscription process.

Figure 4:
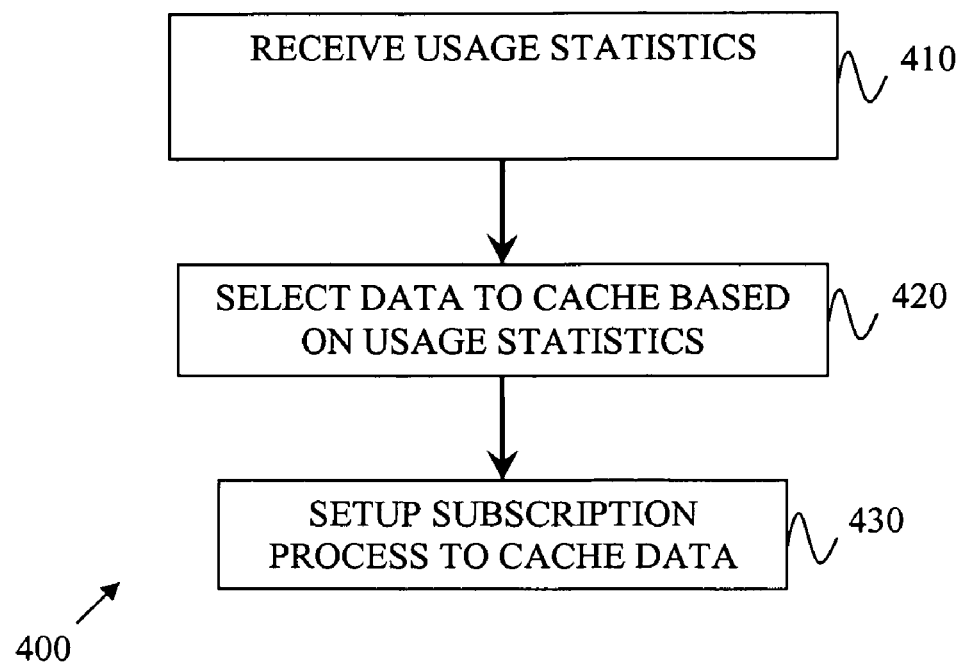
FIG. 4 is a process flow diagram illustrating yet another method for accessing data.

FIG. 4 shows another illustrative method 400 for data access. As shown at 410, information service 130 receives data usage statistics. Information service 130 may receive data usage statistics from another application or may track data usage itself, e.g., based on the data provided by information service 130.

At 420, information service 130 selects, based on data usage statistics, particular data to be cached via a subscription process and a provider system to provide the data. For example, if application 120 continuously requests a particular data that is located at a remote provider system, then information service 130 may select to cache that particular data from the remote provider system to first computing apparatus 105 via a subscription process. For example, information service 130 may track the frequency or number of particular data requests. If the tracked frequency or number of any data requests exceeds a predefined threshold, or otherwise calculated threshold, then information service 130 may trigger local caching. Information service 130 may select a provider based on read-write criteria, level of quality criteria, and the like.

Then at 430, information service 130 causes a subscription process to be created that provides the particular data from the selected provider to cache the requested data locally, e.g., locally to application 120 in first computing apparatus 105. The local caching may be stored in a non-typed persistence provided by information service 130. For example, the local caching may also be stored in object persistency. The subscription or local caching may be for an entire object or for a portion of an object, or the like.

Cache information may be stored in directory 185, for example, as an additional dimension in the directory. Alternatively, cache information may be stored in a separate directory, file, table, or the like. Such a subscription process may be initiated by either a consumer system or a provider system, although it is typically initiated by a consumer system. Information service 130 may also track the subscriptions of data to coordinate the retrieval of data along with the use of directory 185. That is, if a user, or application 120, or information service 130 initiates a subscription process for a particular data, information service 130 stores information about that subscription process for the particular data, for example, in directory 185. With such stored information about a subscription process, information service 130 may provide quicker access to cached data.

That is, information service 130, upon learning of the creation of a subscription process, may determine that a new system may now be able to be a provider of particular data, for example, based on the requested scope of data, and the like. Information service 130 may then modify directory 185 to include a reference to a particular system as a potential provider of data, as a subscription rule. Further, if information service 130 is notified by a subscription process of a change in data (e.g., from a manual update trigger), information service 130 may send the changed data to the relevant consumers.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "information carrier" comprises a "machine-readable medium" that includes any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal, as well as a propagated machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein, do not require the particular order shown, or sequential order, to achieve desirable results. Other embodiments may be within the scope of the following claims.

What is claimed is:

1. A computer program product, comprising a non-transitory computer-readable medium encoding instructions that, when executed by at least one processor, cause the at least one processor to perform operations comprising:
receive a request for data from a system, the request including a scope of the requested data;
determine, from a directory and based on the scope of the requested data, a first provider system that provides a first portion of the requested data in accordance with the scope;
determine, from the directory and based on the scope of the requested data, a second provider system that provides a second portion of the requested data in accordance with the scope, the first portion of requested data and the second portion of requested data, in combination, forming at least the requested data, the first portion differing from the second portion;
request the first portion of data from the first provider system, the first provider system transmitting a request to the second provider system for the second portion of data that includes the first portion of data;
receive the first portion of data and the second portion of data directly from the second provider system; and
provide the received data to the system.

2. A computer program product as in claim 1, wherein the operations further comprise:
determine, from a directory, a first provider system that provides a first portion of the requested data comprises determine, from a directory, a first provider system that provides a first portion of the requested data based on a scope of data requested; and
wherein determine, from the directory, a second provider system that provides a second portion of the requested data, the first portion of requested data and the second portion of requested data, in combination, forming at least the requested data comprises determine, from the directory, a second provider system that provides a second portion of the requested data, the first portion of requested data and the second portion of requested data, in combination, forming at least the requested data based on the scope of data requested.

3. A computer program product as in claim 1, wherein the operations further comprise:
receive a request for data from a system comprises receive a semantic-based request from data from a system;
request the first portion of data from the first provider system comprises request the first portion of data, via a non-semantic-based request, data from the first provider system.

4. A computer program product as in claim 1, wherein the operations further comprise:
determine, from a directory, at least one provider for the data;
determine, from the directory, a specified level of quality for the data;
select a provider that meets the specified level of quality for the data;
request the data from the selected provider;
receive the data from the selected provider; and
provide the data to the system.

5. A computer program product as in claim 1, wherein the operations further comprise:
determine that a request for the data is a read-write access request; and
select, based on the directory, a provider system that provides read-write access to the data.

6. A method for implementation by one or more data processors comprising:
receiving, by at least one data processor, a request for data from a system, the request including a scope of the requested data;
determining, by at least one data processor from a directory and based on the scope of the requested data, a first provider system that provides a first portion of the requested data in accordance with the scope;
determining, by at least one data processor from the directory and based on the scope of the requested data, a second provider system that provides a second portion of the requested data in accordance with the scope, the first portion of requested data and the second portion of requested data, in combination, forming at least the requested data, the first portion differing from the second portion;
requesting, by at least one data processor, the first portion of data from the first provider system, the first provider system transmitting a request to the second provider system for the second portion of data that includes the first portion of data;
receiving, by at least one data processor, the first portion of data and the second portion of data directly from the second provider system; and
providing, by at least one data processor, the received data to the system.

7. A method as in claim 6 further comprising:
determining, by at least one data processor from a directory, a first provider system that provides a first portion of the requested data comprises determine, from a directory, a first provider system that provides a first portion of the requested data based on a scope of data requested; and
wherein determining, from the directory, a second provider system that provides a second portion of the requested data, the first portion of requested data and the second portion of requested data, in combination, forming at least the requested data comprises determining, by at least one data processor from the directory, a second provider system that provides a second portion of the requested data, the first portion of requested data and the second portion of requested data, in combination, forming at least the requested data based on the scope of data requested.

8. A method as in claim 6 further comprising:
receiving, by at least one data processor, a request for data from a system comprises receive a semantic-based request from data from a system;
requesting, by at least one data processor, the first portion of data from the first provider system comprises request the first portion of data, via a non-semantic-based request, data from the first provider system.

9. A method as in claim 6 further comprising:
determining, by at least one data processor from a directory, at least one provider for the data;
determining, by at least one data processor from the directory, a specified level of quality for the data;
selecting, by at least one data processor, a provider that meets the specified level of quality for the data;
requesting, by at least one data processor, the data from the selected provider;

receiving, by at least one data processor, the data from the selected provider; and providing, by at least one data processor, the data to the system.

10. A method as in claim 6 comprising:

determining, by at least one data processor, that a request for the data is a read-write access request; and selecting, by at least one data processor based on the directory, a provider system that provides read-write access to the data.

11. A computer system comprising:

at least one data processor;

memory encoding instructions to cause the at least one data processor to perform operations comprising:

receiving a request for data from a system, the request including a scope of the requested data;

determining, from a directory and based on the scope of the requested data, a first provider system that provides a first portion of the requested data in accordance with the scope;

determining, from the directory and based on the scope of the requested data, a second provider system that provides a second portion of the requested data in accordance with the scope, the first portion of requested data and the second portion of requested data, in combination, forming at least the requested data, the first portion differing from the second portion;

requesting the first portion of data from the first provider system, the first provider system transmitting a request to the second provider system for the second portion of data that includes the first portion of data;

receiving the first portion of data and the second portion of data directly from the second provider system; and providing the received data to the system.

12. A system as in claim 11, wherein the operations further comprise:

determining, from a directory, a first provider system that provides a first portion of the requested data comprises determine, from a directory, a first provider system that provides a first portion of the requested data based on a scope of data requested; and wherein determining, from the directory, a second provider system that provides a second portion of the requested data, the first portion of requested data and the second portion of requested data, in combination, forming at least the requested data comprises determining from the directory, a second provider system that provides a second portion of the requested data, the first portion of requested data and the second portion of requested data, in combination, forming at least the requested data based on the scope of data requested.

13. A system as in claim 11, wherein the operations further comprise:

receiving, a request for data from a system comprises receive a semantic-based request from data from a system;

requesting the first portion of data from the first provider system comprises request the first portion of data, via a non-semantic-based request, data from the first provider system.

14. A system as in claim 11, wherein the operations further comprise:

determining, from a directory, at least one provider for the data;

determining, from the directory, a specified level of quality for the data;

selecting a provider that meets the specified level of quality for the data;

requesting the data from the selected provider;

receiving the data from the selected provider; and providing the data to the system.

15. A system as in claim 14, wherein the operations further comprise:

determining that a request for the data is a read-write access request; and selecting a provider system that provides read-write access to the data.

* * * * *